Sept. 16, 1969  R. W. PETERS  3,467,324
STATOR WINDING MACHINE
Filed Oct. 23, 1965  7 Sheets-Sheet 1
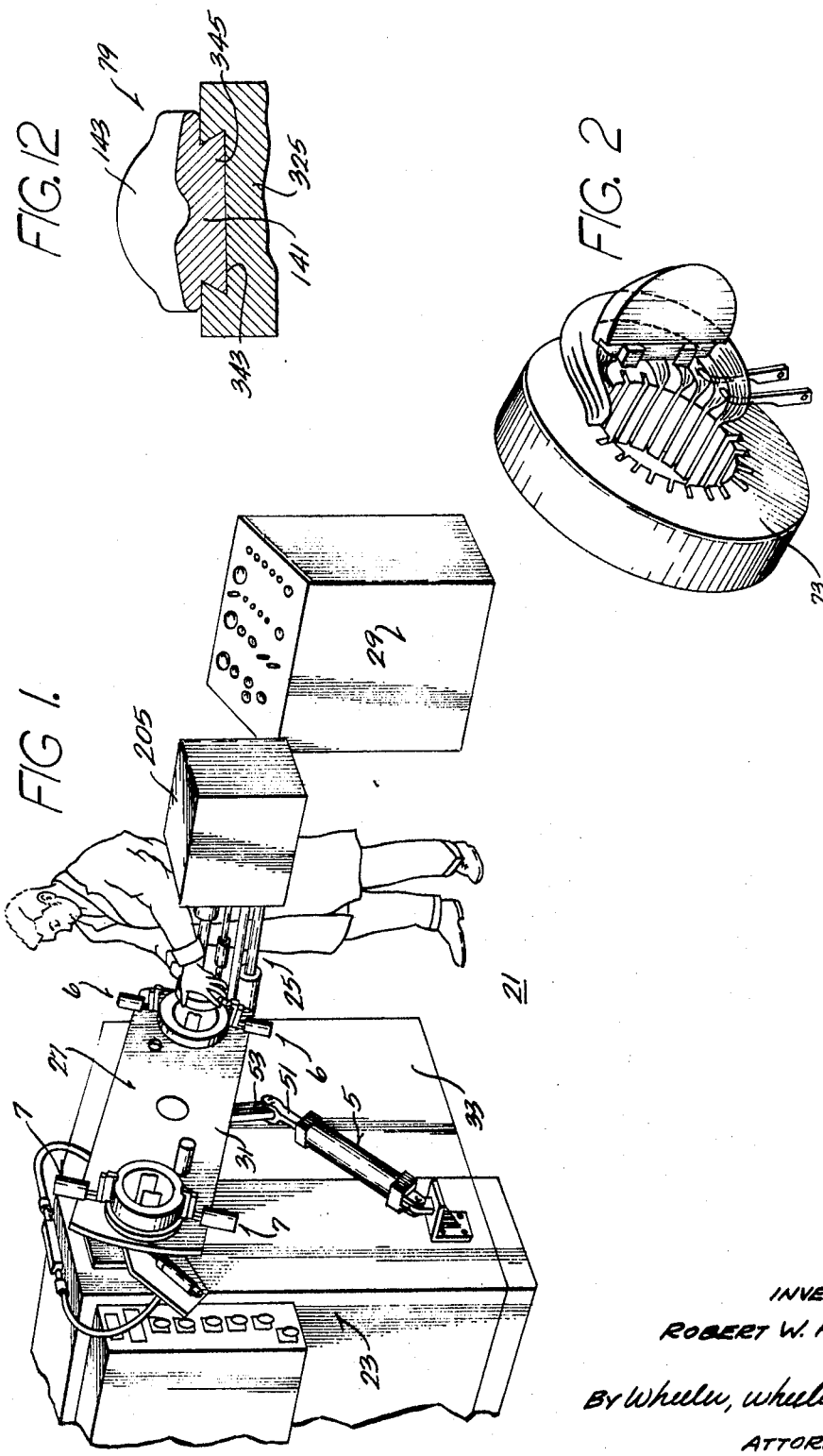
INVENTOR
ROBERT W. PETERS
By Wheeler, Wheeler & Wheeler
ATTORNEYS Sept. 16, 1969  R. W. PETERS  3,467,324
STATOR WINDING MACHINE
Filed Oct. 23, 1965  7 Sheets-Sheet 3

INVENTOR
ROBERT W. PETERS
By Wheeler, Wheeler & Wheeler
ATTORNEYS

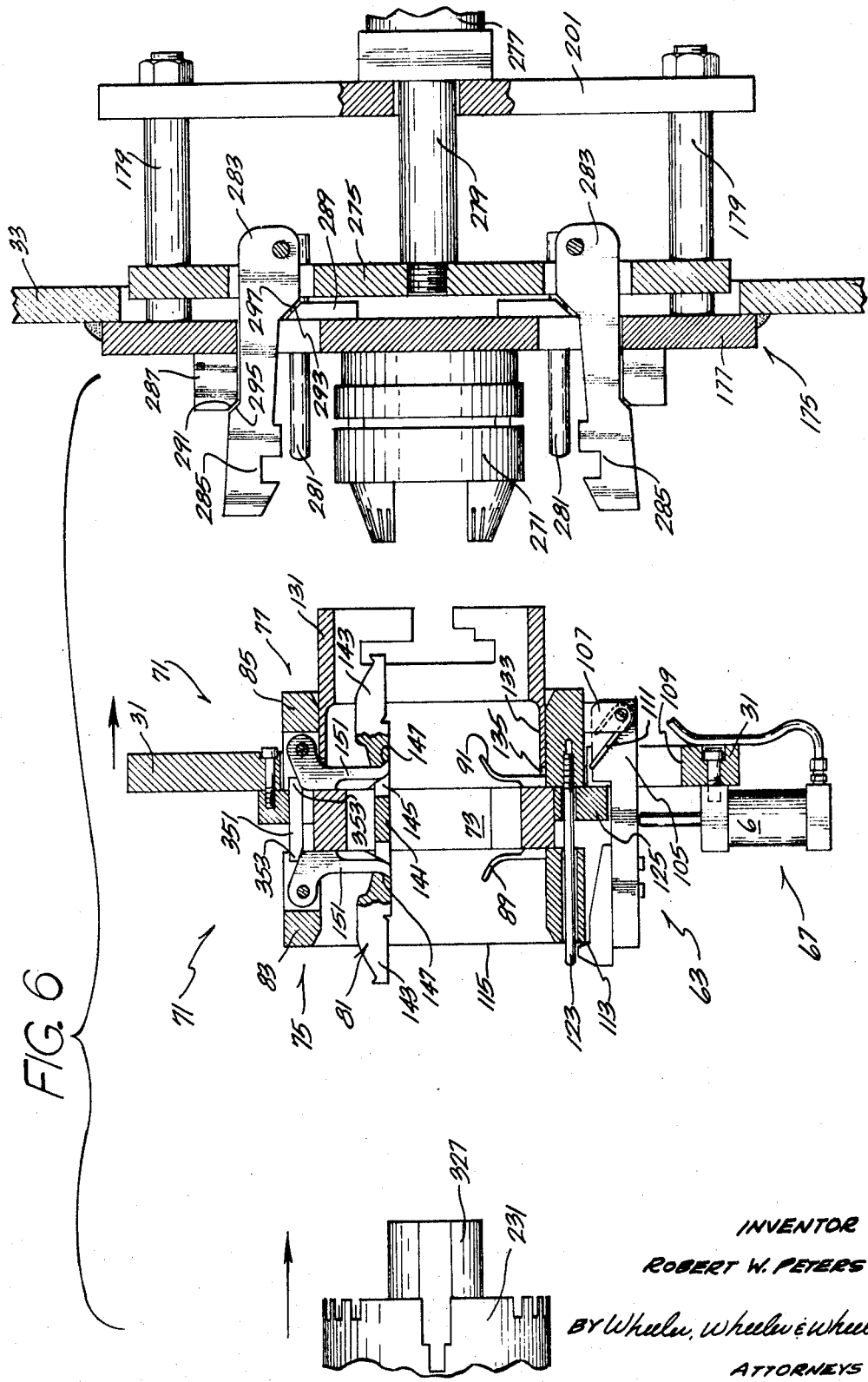

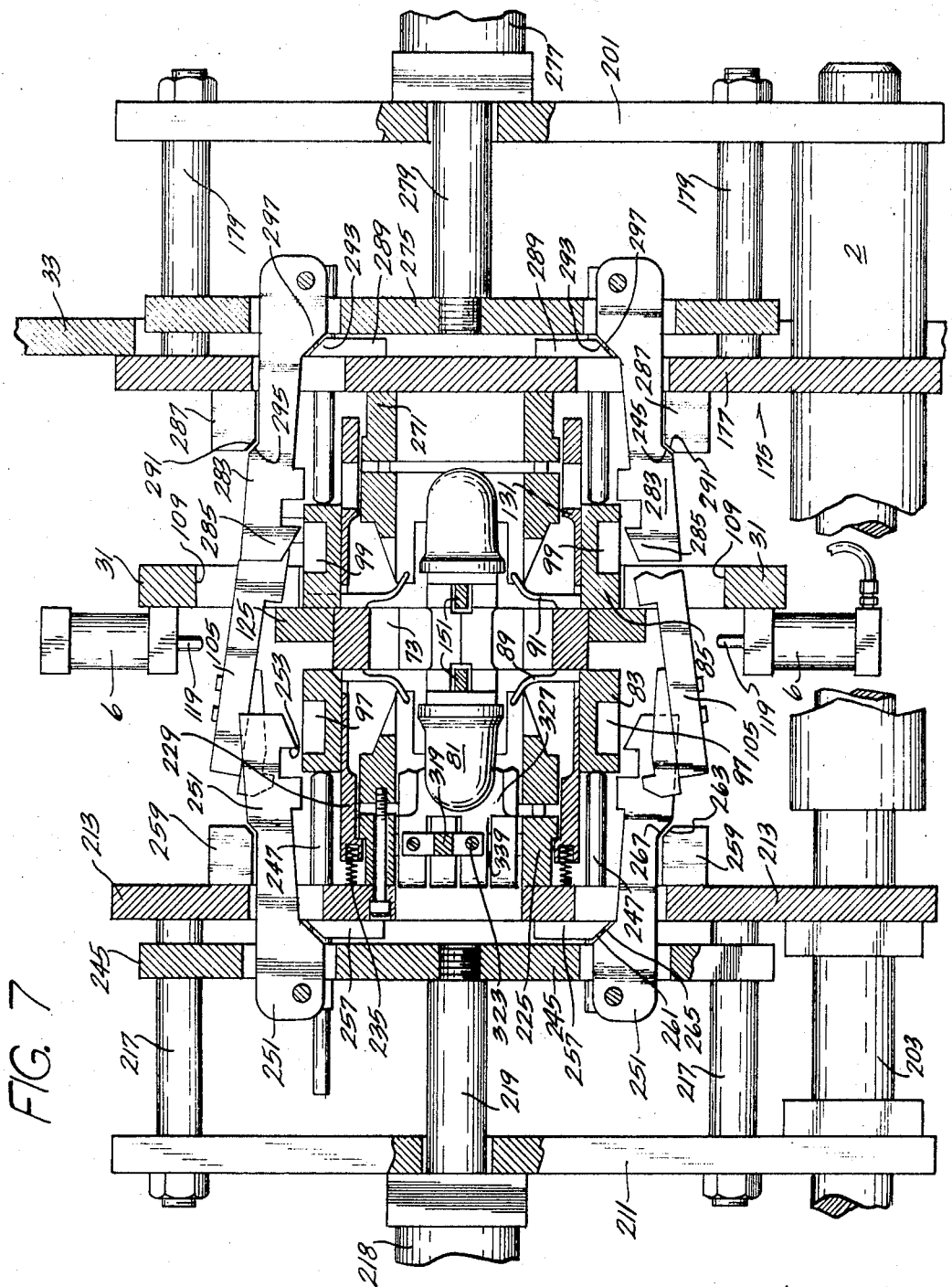

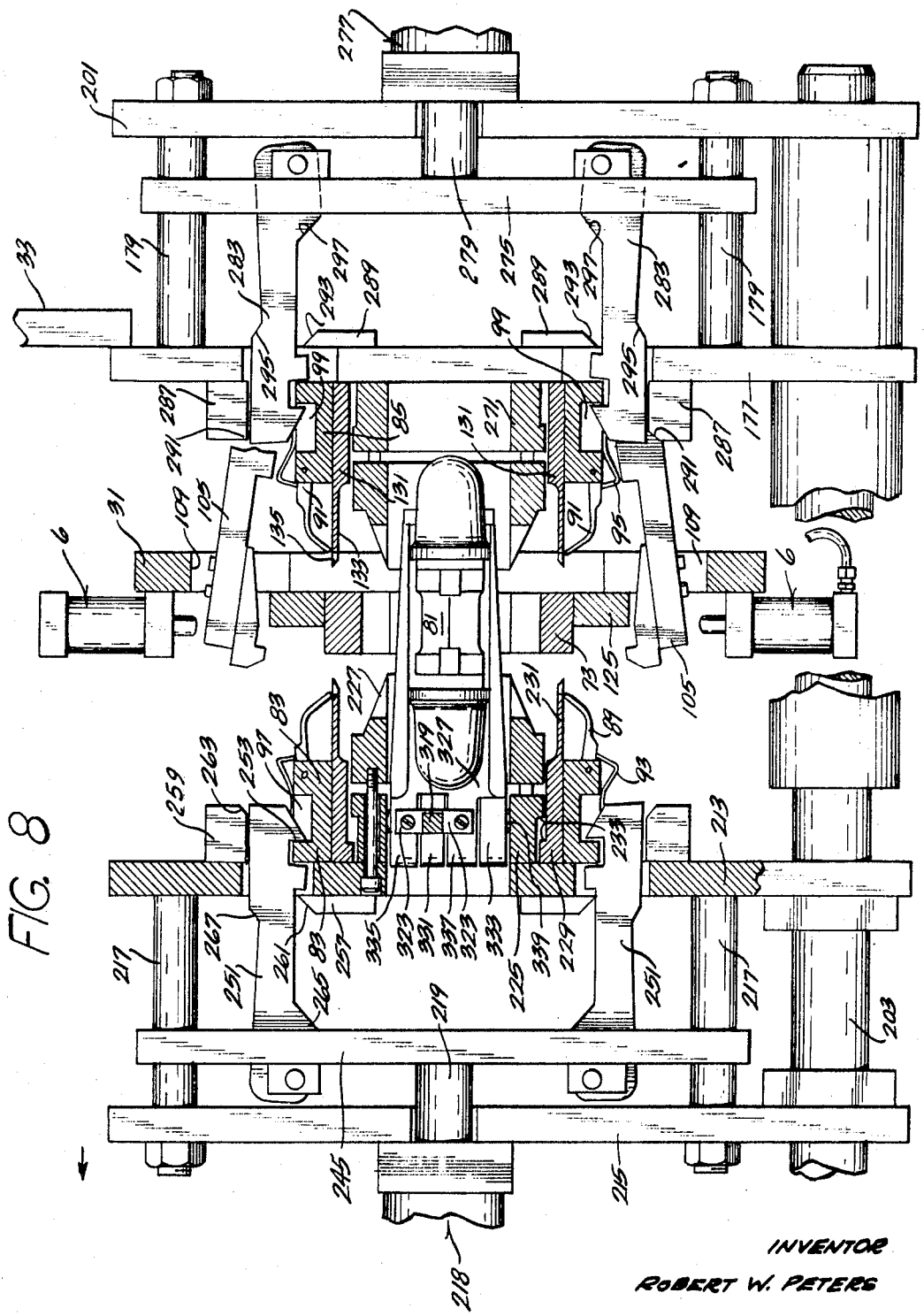

Sept. 16, 1969  R. W. PETERS  3,467,324
STATOR WINDING MACHINE
Filed Oct. 23, 1965  7 Sheets-Sheet 7
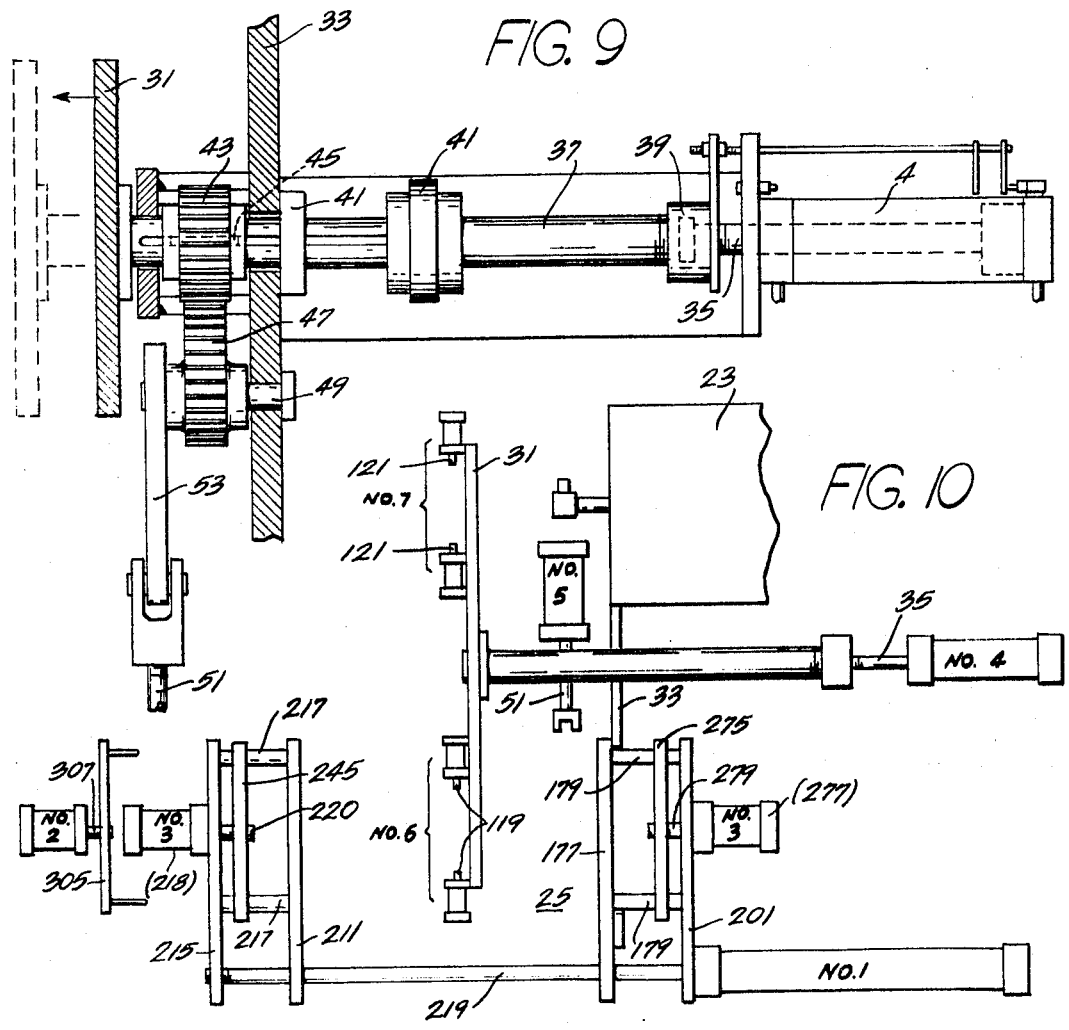
INVENTOR
ROBERT W. PETERS
BY Wheeler, Wheeler & Wheeler
ATTORNEYS United States Patent Office 3,467,324
Patented Sept. 16, 1969

3,467,324
STATOR WINDING MACHINE
Robert W. Peters, Menomonee Falls, Wis., assignor to Henry J. Gorski, Milwaukee, Wis.
Filed Oct. 23, 1965, Ser. No. 502,851
Int. Cl. B65h 81/06
U.S. Cl. 242—1.1        7 Claims

ABSTRACT OF THE DISCLOSURE

A stator winding machine is provided with a rocker arm having stator core holders at its opposite ends and an actuator to oscillate the rocker arm to successively locate the respective core holders between a loading station where a wound stator core is replaced by an unwound core and a winding station where another stator core is aligned with and wound by a winding shuttle. At the loading station, a pair of tooling rings engage the ends of the stator core to locate and support winding guide and horns which assist in directing the wire into the proper slots of the stator core during winding.

---

The invention relates to coil winding apparatus and to stator winding machines such as is generally disclosed in the Gorski Patent No. 3,052,418. The invention also relates to tooling for use in association with such machines.

One of the objects of the invention is to provide a stator winding apparatus which is operable such that the time lost in connection with loading and unloading of the apparatus is reduced to a minimum. Thus, the invention provides apparatus including an arrangement whereby, during winding of one stator, the previously wound stator is removed from the apparatus and the stator to be subsequently wound is loaded into the apparatus. As the time required for stator loading and unloading is generally less than that required for stator winding, the invention permits one operator to load and unload more than a single apparatus.

In accordance with the foregoing, the invention provides for winding apparatus including a winding machine in general accordance with the Gorski Patent No. 3,052,-418, a loading station, and a transfer mechanism which transports stators between the loading station and the winding machine. Another object of the invention is to provide appropriate tooling which is releasably assembled with the stator at the loading station for common movement therewith and which cooperates with the winding machine to afford stator winding.

Other objects and advantages of the invention will become known by reference to the following description and the accompanying drawings in which:

FIGURE 1 is a perspective view of a stator winding apparatus embodying various of the features of the invention;

FIGURE 2 is a perspective view of a partially wound stator with fragments of various of the tooling components shown in their position during the winding operation;

Figure 3:
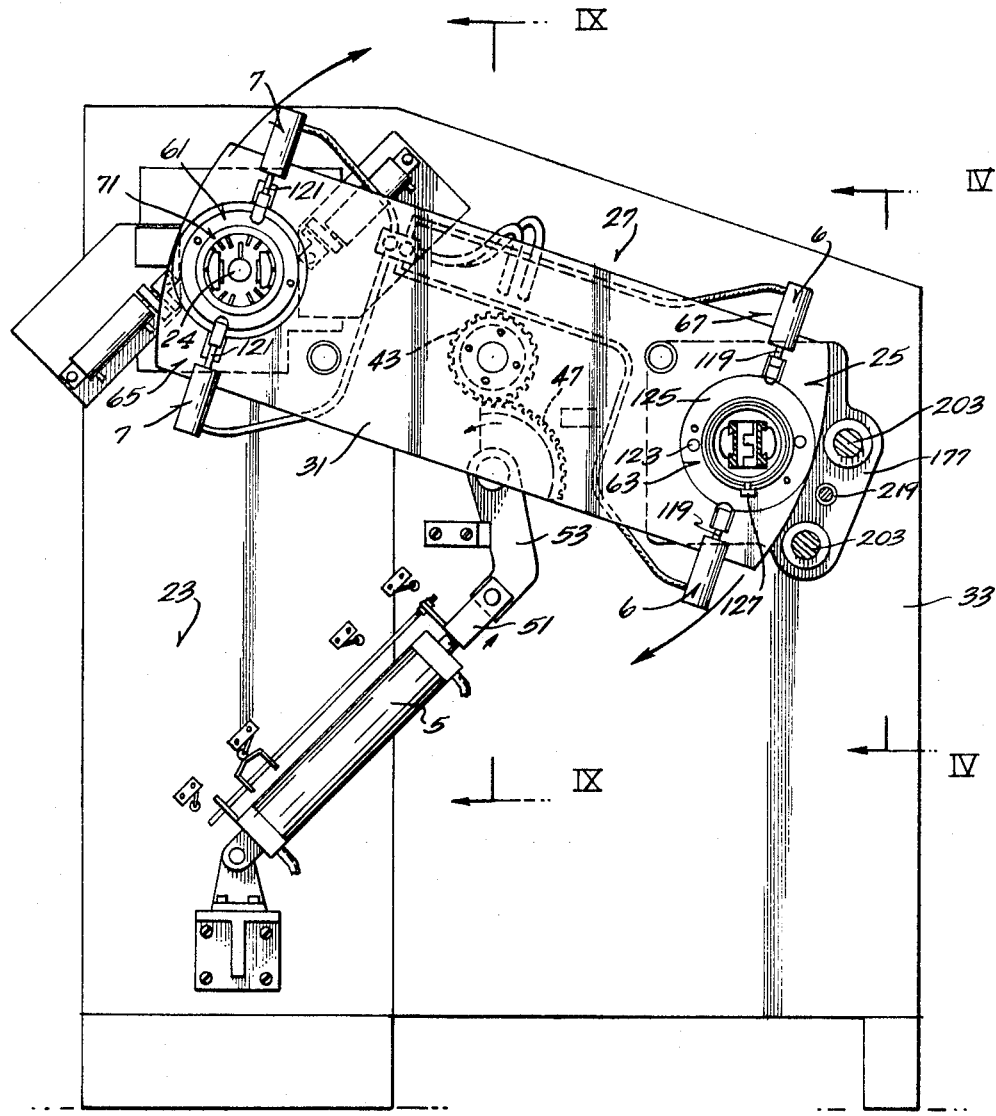
FIGURE 3 is an elevational view, partially in section, of the end of the apparatus shown in FIGURE 1.

FIGURE 6 is an enlarged, partially schematic sectional view showing the disposition of portions of the loading station and the transfer mechanism after loading thereon of a stator assembly, the upper part of the central portion of the view being viewed at about a 90 degree angle from the other portions of the view and the lower part of the central portion being viewed at about a 10 degree angle from the other portions of the view;

FIGURE 7 is a partially sectioned view of components of the transfer mechanism and the loading station in the position just prior to withdrawal of the tooling from a previously wound stator;

FIGURE 8 is a view similar to FIGURE 7, showing the tooling in partially removed condition with respect to the stator;

FIGURE 9 is an enlarged view taken generally along line 9—9 of FIGURE 3;

FIGURE 10 is a schematic view of the fluid system which sequentially operates the apparatus;

FIGURE 11 is a chart showing the sequence of operation; and

Figure 5:
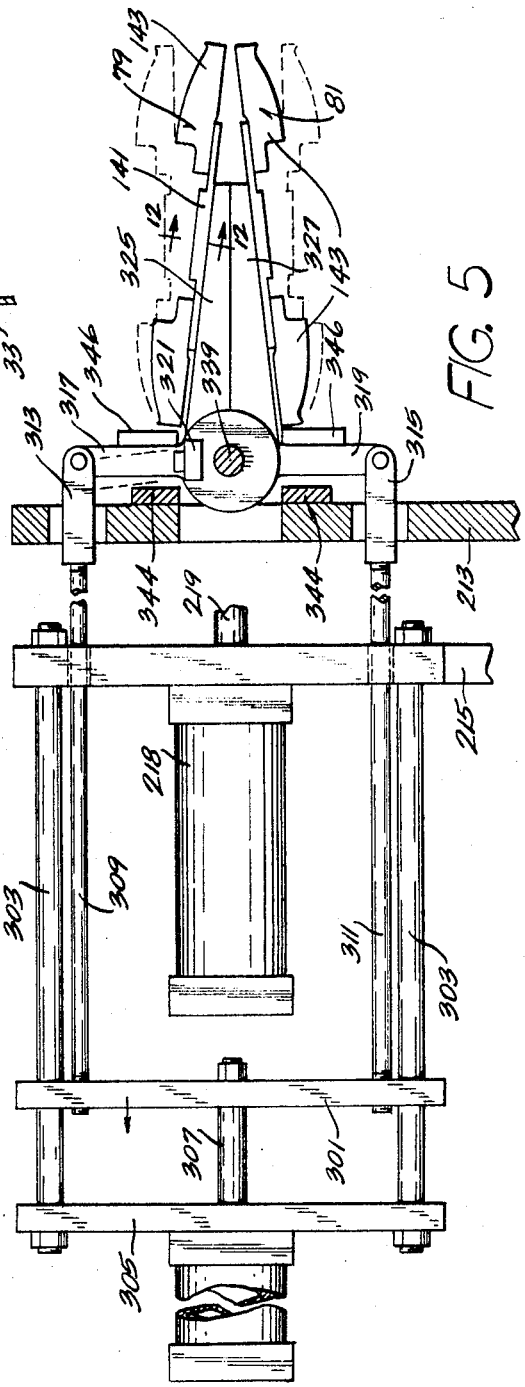
FIGURE 5 is an enlarged fragmentary view, partially in section, and taken along line 5—5 of FIGURE 4.

FIGURE 12 is an enlarged sectional view taken along line 12—12 of FIGURE 5.

Shown in FIGURE 1 is a winding apparatus 21 which is constructed in accordance with the invention and which includes a winding machine 23 such as disclosed in the Gorski Patent No. 3,052,418, a loading station, broadly identified by the numeral 25, a transfer mechanism 27 for transporting stators and accompanying tooling between the winding machine 23 and the loading station 25, and a console 29 through which operation of the overall apparatus 21 is controlled and co-ordinated.

The winding machine 23 includes, as disclosed in the Gorski Patent 3,052,418, a shuttle 24 (see FIG. 3) and means supporting the shuttle for reciprocation and oscillation.

The transfer mechanism 27 comprises a rocker arm or turntable 31 which is mounted on the frame 33 of the overall apparatus 21 for oscillation between two positions spaced 180 degrees from each other and for reciprocation in the direction of the axis of oscillation between a first position facilitating winding and a second position facilitating movement between the two angularly spaced positions. The rocker arm 31 is reciprocable between the winding and transport positions by means (see FIGURE 9) including a fluid ram 4 having a piston rod 35 which is joined to a support rod 37 through a connection 39 affording common reciprocating movement and angular lost motion. The support rod 37 is guided for oscillation and reciprocation by bearings 41 supported by the frame 33 and at its outer end, is connected to the rocker arm 31.

The rocker arm 31 is oscillatable between its two angularly spaced positions by means including a gear 43 keyed at 45 to the support rod 37 to afford common rotary movement but to allow relative axial movement. The gear 43 is meshed with a gear segment 47 (see also FIGURE 3) which is rotatably mounted on a shaft 49 which is journalled in the frame 33 of the overall apparatus 11. The gear segment 47 is oscillated by a fluid ram 5 which is pivotally mounted on the frame 33 and which includes a piston rod 51 pivotally connected to a crank 53 connected to the gear segment 47.

The rocker arm includes two generally identical but spaced receptacles 61 and 63 (see FIGURE 3) and related clamping mechanisms 65 and 67 for respectively receiving and holding a stator group or assembly 71 comprising (as shown in FIGURE 6) a schematically shown stator 73, a pair of tooling rings 75 and 77, and a pair of winding horns 79 and 81 (see also FIGURE 5). In each of its angularly spaced positions, one of the rocker arm receptacles 61 and 63 is located in alignment with the axis of reciprocation and oscillation of the winding machine 23 to facilitate stator winding, and the other one of the receptacles 61 and 63 is located in alignment with the axis of the loading station 25 to facilitate assembly and disassembly of one stator group 71 from its component parts and releasably mounting another stator group 71 in the rocker arm.

As shown in FIG. 2, the stator 73 includes a central bore with a plurality of slots extending radially outwardly from the bore and defined by a series of intervening lands.

The tooling rings 75 and 77 respectively include cylindrical bases or ring members 83 and 85 which respectively pivotally support a circumferentially extending plurality of pivotally mounted fingers 89 and 91 which are respectively biased to the positions shown in FIGURE 8 and which are located, when the tooling rings 75 and 77 are organized in the assembly 71 so that the fingers 89 and 91 are in alignment with the lands intervening between the slots of the stator.

As also shown in FIGURES 7 and 8, the ring members 83 and 85 respectively include pairs of recesses 97 and 99 which are adapted to be engaged by respective clamping arms 251 and 283 to effect axial withdrawal of the ring members 83 and 85 from their assembled condition with the stator 73. The mounting of the clamping arms 251 and 283 will be described hereinafter.

The tooling rings 75 and 77 are retained in assembled relation to each other and to the stator 73 and the rocker arm 31 by means including a diametrically opposed pair of generally identical clamps 105 (see especially FIGURE 7) which are mounted on brackets 107 (see FIGURE 6) extending from the ring member 85, which extend through appropriate openings 109 in the rocker arm 31, and which are biased for limited movement to an open or unlocking position by suitable means in the form of respective springs 111.

The clamps 105 each include jaws 113 (see FIGURE 6) which are adapted to engage the end margin 115 of the ring member 83 to effect assembly of the tooling rings 75 and 77, the stator 73, and the rocker arm 31. The clamps 105 are displaced to their clamping or locking positions by pairs of fluid rams 6 and 7 which are respectively associated with the spaced receptacles 61 and 63, which are components of the clamping mechanisms 65 and 67, which are mounted on the rocker arm 31, and which respectively include actuating rods 119 and 121 (see FIGURES 3 and 10).

Means are provided for aligning the tooling rings 75 and 77 with the rocker arm 31. Such means includes, as also shown in FIGURE 6, at least one and preferably two dowel pins 123 which are mounted on the ring member 85, and which extend, when the tooling rings 75 and 77, the stator 73, and the rocker arm 31 are in assembled condition, through mating pilot holes in a guide ring 125 fixed on the rocker arm 31 and in the ring member 83. Preferably, the guide rings 125 also include pilot means 127 (see FIGURE 3) engageable with the stator 73 to angularly locate the stator 73 with respect to the guide rings 125 and therefore with respect to the tooling rings 75 and 77.

As seen in FIGURES 6 and 8, there is internally mounted on the ring member 85 for reciprocal movement relative to the ring member 85 a sleeve 131 comprising a finger guide or cam which includes a thin wall cylinder section 133 having therein a plurality of guide or cam slots 135 (see FIGURE 8), which afford passage therethrough of the fingers 91 during withdrawal of the ring member 85 from the stator 73 and which serve to effect rotation of the fingers 91 to permit their passage out of the wound stator. Any suitable means can be employed to retain the finger guide 131 in assembled relation with the ring member 85 for common movement with the ring member 85 during movement of the rocker arm 31.

As already noted, a completed stator group 71 also includes a pair of double ended horns 79 and 81 (see FIGURES 6 and 7) which are generally of identical construction. In addition, each half of each of the horns 79 and 81 is also of generally identical construction. Each horn generally has (see FIGURE 6) a base part or member 141 and at each end thereof, respective horn members 143 which have smooth outer surfaces affording wire guidance without damaging the insulation of the wire. The base member 141 includes two locking apertures or recesses 145 which include inclined locking surfaces 147, and which constitute components of means for locking the horns or shoes 79 and 81 in assembled relation with the tooling rings 75 and 77 and with the stator to be wound. In this regard, the pair of shoes or horns 79 and 81 are inserted by a transport mechanism still to be described, in the tooling rings 75 and 77 and the stator 73 immediately prior to advance of the ring members 83 and 85 into position for assembly with the stator and the rocker arm 31 and are locked in position during assembly of the tooling rings 75 and 77 with the rocker arm 31. The horn locking means also includes pivotally mounted clamp members 151 which are shown best in FIGURE 6. In this regard, each of the ring members 83 and 85 includes two clamp members 151 (one for each horn). In operation, the horns 79 and 81 are initially inserted in opposed adjacent relation to each other, as shown in full lines in FIGURE 5, and are then separated to a parallel position shown in dotted lines in FIGURE 5, before the tooling rings 75 and 77 are displaced toward the stator. The clamp members 151 for each horn are inserted into the recesses 145 as the tooling rings 75 and 77 approach the stator 73. In this regard, each guide ring 125 on the rocker arm 31 includes a pair of diametrically opposed camming pins 351 which include, at each end, inclined camming surfaces 353 adapted, incident to approach of the rings, to engage and effect final camming of the clamp members 151 away from each other to effect locking of the horns 79 and 81 with respect to the ring members 83 and 85 and generally in engagement with the bore of the stator 73. Any suitable means can be employed to retain the camming pins 351 on the guide ring 125.

After the winding horns 79 and 81 and the tooling rings 75 and 77 are locked with respect to one another and to the stator 73 and rocker arm 31, the rocker arm 31 can be oscillated to transport the assembled stator group to the winding machine 23 upon the completion of the winding operation on the stator assembly previously located at the winding machine 23.

The loading station 25 is mounted on the frame 33 of the apparatus and includes (see FIGURE 4) a sub-frame 175 together with mechanisms for advancing and withdrawing both ring members 83 and 85 and for inserting and withdrawing the winding horns 79 and 81, all relative to the rocker arm 31 and stator 73 carried thereby.

Figure 4:
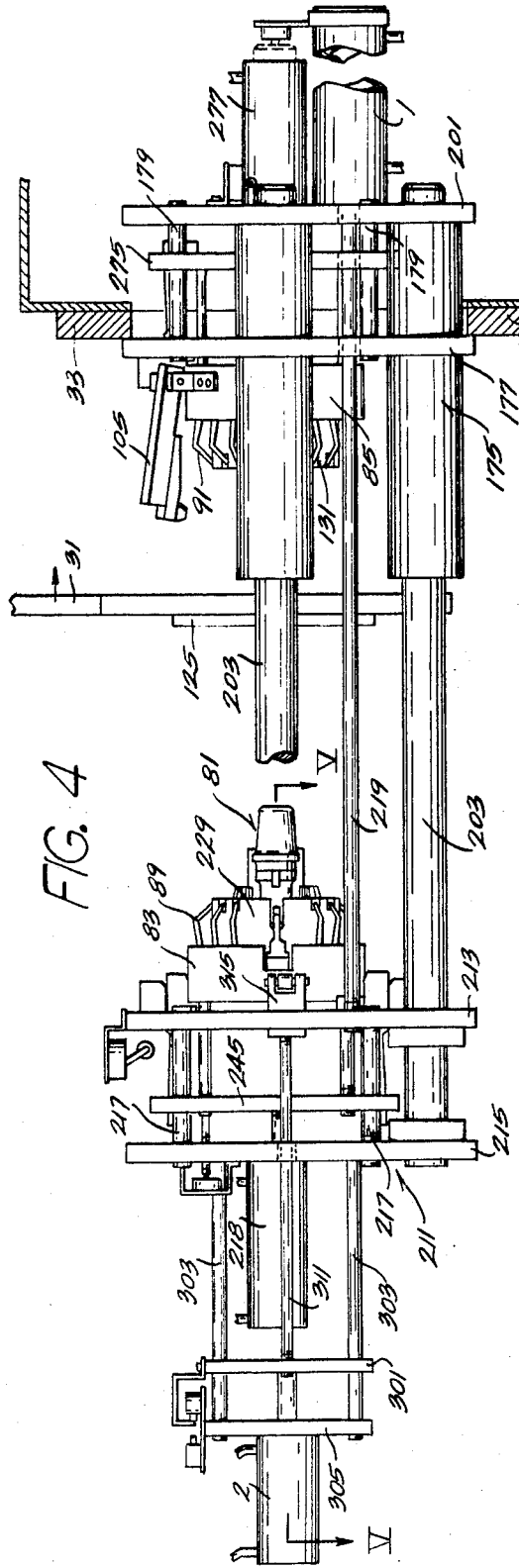
FIGURE 4 is a partially sectioned, enlarged elevational view taken along line 4—4 of FIGURE 3, showing the loading station of the apparatus in unloaded and fully retracted condition.

The sub-frame 175 comprises (see FIGURE 4) a base plate 177 which is suitably fixed to the frame 33 and which has extending therefrom (to the right in FIGURE 4) a plurality of shouldered support arms 179 fixedly carrying a back plate 201. Extending in the other direction from the base plate 177, as best seen in FIGURES 3 and 4, are a pair of support rods 203 which support a housing 205 (see FIGURE 1). Located in the housing 205 are the major components of the mechanisms for advancing and withdrawing the ring member 83 and for inserting and withdrawing the winding horns 79 and 81.

More particularly, the mechanism for advancing and withdrawing the ring member 83 comprises, as seen best in FIGURES 4 and 8, a traveling frame 211 which is reciprocally displaceable on the support rods 203 for movement between advanced and retracted positions. The traveling frame 211 includes a front plate 213 and a back plate 215 which are spaced by support rods 217. The traveling frame is displaceable between its retracted and advanced positions by a fluid ram 1 which is mounted on the back plate 201 and which includes a piston rod 219 connected to the front plate 213.

As shown in FIGURE 8, there is mounted on the front plate 213, a hollow, ring support member 225. The end of the ring support member 225 remote from the front plate 213 is in the form of a truncated cone and is slotted as shown at 227. Telescopically carried on the support member 225 is a sleeve 229 having a thin walled cylindrical section 231 with cam slots through which the fingers 89 extend when the tooling ring 83 is retracted from the rocker arm 31 and which serve to cam the fingers 89 radially outwardly and out of the wound stator as the tooling ring is retracted from the rocker arm.

The sleeve 229 floats on the ring support member 225 for limited reciprocation axially of the support member 225 and is constrained against excessive movement in the direction away from the front plate 213 by engagement of abutting shoulders on the sleeve and support member, as shown at 233. The sleeve 229 is constrained against excessive movement in the other direction by the front plate 213. Springs 235 (see FIGURE 7) bias the sleeve in the direction away from the front plate 213.

The mechanism for advancing and withdrawing the ring member 83 with respect to the rocker arm 31 includes a movable plate 245 which is reciprocally carried on the support rods 217 for movement between retracted and advanced positions relative to the front and back plates 213 and 215 and which is displaceable by a fluid ram 218 mounted on the frame 211 and having a piston rod 219 connected to the movable plate 245. Pivotally mounted on the moving plate 245 are a pair of clamping arms 251 which, at their outer ends, have hook portions 253 releasably engageable with the recesses 97 in the tooling ring 83 to effect advancing movement and withdrawal or retracting movement of the ring member 83 with the plate 245.

The clamping arms 251 and the traveling frame 211 are provided with interengaging camming surfaces which effect movement of the clamping arms 251 into and out of holding engagement with the ring member 83. More specifically, blocks 257 and 259 having respective camming surfaces 261 and 263 are mounted on the front plate 213 for engagement with respective cooperating surfaces 265 and 267 on the clamping arms 215. Thus, in operation, assuming arrival at the loading station 25 of a wound stator group 71, when the movable plate 245 approaches its advanced or extended position with respect to the front plate 213, engagement of the surfaces 261 and 265 cams the clamping arms 215 pivotally outwardly so as to clear the periphery of the ring member 83. Subsequent initial retraction of the plate 245 is accompanied by corresponding movement of the clamping arms 251 away from the rocker arm 31 and effects camming engagement of the surfaces 263 and 267, whereby the hook portions 253 are moved into gripping engagement with the recesses 97 in the tooling ring 83. Upon subsequent further retraction, the ring member 83 is disassembled from the stator group and is telescoped over the sleeve 229 when the plate 245 is fully retracted. Subsequent advance of the plate 245 effects movement of the ring member 85 toward the rocker arm 31 and displacement of the clamping arms 251 to their outer positions clear of the ring member 83. The ring member 83 is retained against angular movement during advancement and retraction by pivot rods 247 which enter into mating apertures (not shown) in the ring member 83.

The mechanism for advancing and withdrawing the other ring member 85 with respect to the rocker arm 31 comprises a movable plate 275 which is reciprocally carried on the support rods 179 for movement between retracted and advanced positions. Such displacement is provided by a fluid ram 277 which is mounted on the back plate 201, which is identified by one of the numerals "3" in FIGURES 10 and 11, and which includes a piston rod 279 connected to the movable plate 275.

Pivotally carried on the movable plate 275 are a pair of clamping arms 283 which, at their outer ends, have hook portions 285 releasably engageable with the recesses 99 in the ring member 85 to effect advancement and withdrawal or retraction of the ring member 85 with the plate 275. In the fully retracted position, the tooling ring is telescopically located on a stationary ring support member 271 which is mounted on the base plate 177, and serves to support the sleeve 131 and the ring member 85 when the ring member 85 is fully withdrawn from the rocker arm 31. Angular movement of the ring member 85 and sleeve 131 is restrained during reciprocating movement thereof by pilot rods 281 which extend from the plate 177 and extend into mating bores or apertures (not shown) in the ring member 85.

Mounted on the base plate 177 are blocks 287 and 289 having respective camming surfaces 291 and 293 which respectively cooperate with camming surfaces 295 and 297 on the clamp arms 283 to effect clamping arm action in a manner generally identical to that described with respect to the clamping arms 251.

As can be seen from the foregoing, the action of the clamping arms 251 and 283 in advancing and withdrawing the ring members 83 and 85 is generally identical, except that the ring member 85 carries the sleeve 131 with it, while the sleeve 229 is permanently associated with the support member 225.

The mechanism for inserting and withdrawing the winding horns 79 and 81 comprises (see especially FIGURE 5) a movable plate 301 which is reciprocally carried on a pair of shouldered arms 303 extending from the back plate 215 of the travelling frame 211. At their outer ends, the arms 303 are connected by a plate 305 which supports a fluid cylinder or ram 2 including a piston rod 307 connected to the movable plate 301 to effect displacement of the movable plate between retracted and advanced positions. Connected to the movable plate 301 are a pair of push rods 309 and 311 which extend laterally outwardly of the movable plate 245 and through openings in the front and back plates 213 and 215, respectively, and which include, at the ends adjacent to the rocker arm 31, respective clevises 313 and 315.

Pivotally connected with the clevises 313 and 315 are respective crank members 317 and 319 including respective base parts 321 (see FIGURE 5) and 323 (see FIGURE 8) which are suitably connected by bolts or otherwise to a pair of horn support arms 325 and 327 (FIGURE 5). The horn support arms 325 and 327 respectively include (see FIGURE 7) spaced annular or ring portions 329 and 331, and 333 and 335, which pivotally connect the support arms 325 and 327 about a pivot rod 339 (see FIGURE 5) mounted by and across the support member 225.

Each of the horn support arms 325 and 327 includes, as seen best in FIGURE 5, a tapering main portion 341 having a guide or track 343 which is shown best in FIGURE 12, and which has an interlocking cross sectional configuration mating with a simlar cross sectional configuration 345 provided on the base part or member 141 of the respective winding horns 79 and 81. In operation, movement of the plate 301 to the left from the position shown in FIGURE 5 effects opposite angular motion of the support arms 325 and 327 from their full line positions shown in FIGURE 5 to the dotted line positions shown in FIGURE 5. Similarly, subsequent movement of the plate 301 to the right as shown in FIGURE 5 displaces the support arms 325 and 327 from their dotted positions to their full line positions as shown in FIGURE 5. Rotation of the cranks 317 and 319 is limited by abutting engagement with stops 344 and 346 (see FIGURE 5) supported by the plate 213.

The overall operation of the apparatus is as follows: assuming initially the presence of a stator assembly clamped to the rocker arm 31 by reason of the advanced condition of the rams 7, and located for winding at the machine 23 by reason of the retracted condition of the rams 4 and 5 (see FIGURE 10), and assuming further, the placement of an unwound stator in the guide ring 125 located at the loading station 25, that the traveling frame is retracted by the ram 1, that the tool ring clamping rods 119 are retracted by the rams 6, that the horn transport mechanism is located by the ram 2 in its advanced position, and that the tooling ring transport mechanisms are retracted by the rams 3.

Upon loading of a stator to be wound into the guide ring 125, the operator initiates retracting operation of the ram 1 which displaces the traveling frame 211 to the right as seen in FIGURE 10 and thereby inserts the horns 79 and 81 into the stator in the position shown in FIGURE 5 (sequence step 1—see FIGURE 11). The ram 2 then retracts to effect separation of the horns 79 and 81 into their spaced apart parallel relation as shown in dotted outline in FIGURE 5 (sequence step 2). The rams 3 are then actuated to advance the ring members 83 and 85 into engagement with the stator (sequence step 3). As already noted, movement of the ring members toward the rocker arm 31 causes the clamping arms 251 and 283 to be cammed clear of the ring members and also effects locking of the winding horns 79 and 81 with respect to the ring members 83 and 85. The locking rams 6 are then actuated to advance the rods 119 to clampingly engage the clamp 105 over the ring member 83 to complete clamping of the stator group 71 to the rocker arm 31 (sequence step 4). The traveling frame 211 is then moved away from the rocker arm 31 by advancing operation of the ram 1, thereby withdrawing the support arms 325 and 327 from the horns (sequence step 5) and withdrawing the support ring 225 and associated sleeve 229 from the ring member 83. When the winding of the stator group at the winding machine 23 is completed, the ram 4 is then actuated to its advanced position to displace the rocker arm 31 away from the winding machine 23 and to its traveling position (sequence step 6). Such movement of the rocker arm 31 also withdraws and disconnects the ring member 85 and accompanying sleeve 131 from ring support member 271. When the rocker arm 31 is in its traveling position, the ram 5 is then actuated to its advanced position to rotate the rocker arm 31 so as to locate the unwound stator assembly at the winding machine 23 and to locate the previously wound stator assembly at the loading station 25 (sequence step 7).

The ram 4 is then retracted to locate the rocker arm 31 in its winding position, thereby also effecting telescopic placement of the ring member 85 and accompanying sleeve onto the ring support member 271 (sequence step 8). The ram 1 is then retracted to cause movement of the traveling frame 211 to the right in FIGURE 10 and to cause insertion of the horn support arms 325 and 327 into the horns 79 and 81 and to insert the ring support member 225 into the ring member 83 (sequence step 9). Rams 7 are then actuated to retract the rods 121 and unlock the previously wound stator assembly (sequence step 10). The rams 3 are then actuated to retract the ring member transporting mechanisms, whereby the clamping arms 251 and 283 are respectively engaged in the recesses 97 and 99 and the ring members 83 and 85 are withdrawn from the stator groups and disconnected from the winding horns 79 and 81 (sequence step 11). The ram 2 is then advanced to rotate the winding horns 79 and 81 to their full line positions shown in FIGURE 5 (sequence step 12). Finally, the ram 1 is actuated to advance the traveling frame 211 away from the rocker arm 31 (sequence step 13) to facilitate stator removal and replacement with respect to the guide ring 125.

The next loading and unloading sequence is generally the same as that already described except that, in sequence step 4, the rams 7 are advanced instead of the rams 6. In addition, in sequence step 7, the ram 5 is retracted instead of advanced to effect movement of the rocker arm 31 and, in sequence step 10, the rams 6 are retracted instead of the rams 7.

Various of the features of the invention are set forth in the following claims.

What is claimed is:

1. In a stator winding machine, the combination of a shuttle adapted to support a winding head, means for supporting said shuttle for reciprocating and oscillating movement, a support, spaced duplicate means on said support for mounting and for releasably clamping a stator to be wound, and means for selectively locating said support in a first position wherein one of said duplicate means is located in alignment with the axis of reciprocation of said shuttle, and in a second position wherein the other one of said duplicate means is located in alignment with the axis of reciprocation of said shuttle.

2. In a stator winding machine, the combination of a shuttle adapted to support a winding head, means for supporting said shuttle for reciprocating and oscillating movement, a support, duplicate means on said support for mounting and for releasably clamping a stator to be wound, a stator loading station, and means for selectively locating said support in a first position wherein one of said duplicate means is located at said loading station and the other of said duplicate means is located in alignment with the axis of reciprocation of said shuttle, and in a second position wherein said other one of said duplicate means is located at said loading station and said one of said duplicate means is located in alignment with the axis of reciprocation of said shuttle.

3. In a stator winding machine, the combination of a shuttle adapted to support a winding head, means for supporting said shuttle for reciprocating and oscillating movement, a support arm, spaced duplicate means on said support for mounting and for releasably clamping a stator to be wound, means for selectively locating said support arm in a first position wherein one of said duplicate means is located in a first location in alignment with the axis of reciprocation of said shuttle, and the other of said duplicate means is located at a second location, and in a second position wherein said other one of said duplicate means is located in alignment with the axis of reciprocation of said shuttle, and said one of said duplicate means is located at said second location, a pair of tooling rings, means on said frame for releasably holding said tooling rings and for transporting said tooling rings to and from positions located, when said arm is in either of said first or second positions, adjacent to said arm and confining therebetween a stator located in the one of said duplicate means in said second location, means on said tooling rings and on said arm for releasably holding said tooling rings on said arm in said stator confining positions, a pair of winding horns, means on said frame for releasably holding said winding horns and for transporting said winding horns to and from positions extending, when said arm is in either of said first or second positions, through said tooling rings and through the stator located in the one of said duplicate means in said second location, and means on said tooling rings and on said horns for releasably holding said horns in said positions.

4. In a stator winding machine, the combination of a frame, a support arm having a stator receptacle, bearings mounting said support arm on said frame for movement relative to a position affording loading of a stator in said receptacle, a pair of ring members, means on said frame for transporting said ring members to and from positions located, when said arm is in said position, adjacent to said arm and confining therebetween a stator located in said receptacle, means on said ring members and on said arm for releasably holding said ring members to said arm in said stator confining positions, a winding horn, means on said frame for transporting said winding horn to and from a position extending, when said arm is in said position, through said ring members and through the stator located in said receptacle, and means on said ring members and on said horn for releasably holding said horn in said position.

5. In a stator winding machine, the combination of a frame, a support arm having a stator receptacle, bearings mounting said support arm on said frame for movement relative to a position affording loading of a stator in said receptacle, a pair of tooling rings, means on said frame for releasably holding said tooling rings and for transporting said tooling rings to and from positions located, when said arm is in said position, adjacent to said arm and confining therebetween a stator located in said receptacle, means on said tooling rings and on said arm for releasably holding said tooling rings to said arm in said stator confining positions, a winding horn, means on said frame for releasably holding said winding horn and for transporting said winding horn to and from a position extending, when said arm is in said position, through said tooling rings and through the stator located in said receptacle, and means on said tooling rings and on said horn for releasably holding said horn in said position.

6. In a stator winding machine, the combination of a frame, a support arm having a stator receptacle, bearings on said frame mounting said support arm for movement relative to a loading position affording loading of a stator in said receptacle, a pair of tooling rings, means on said frame for releasably holding said tooling rings and for transporting said tooling rings to and from positions located, when said arm is in said loading position, adjacent to said arm and confining therebetween a stator located in said receptacle, means on said tooling rings and on said arm for releasably holding said tooling rings on said arm in said stator confining positions, a pair of winding horns, means on said frame for releasably holding said winding horns and for transporting said winding horns to and from positions extending, when said arm is in said loading position, through said tooling rings and through the stator located in said receptacle, and means on said tooling rings and on said horns for releasably holding said horns in said positions.

7. An assembly for use in winding a stator having a central bore with a plurality of slots extending radially outwardly from the bore and defined by a series of spaced lands, said assembly comprising a pair of ring members having a plurality of pivotally mounted fingers, means on said ring members for releasably locking said ring members in aligned relation to each other with the stator confined therebetween and with said fingers aligned with the lands, a winding horn having an aperture therein, and a hook member pivotally mounted to one of said tooling rings and projectable into said aperture for engagement with said horn for releasably locking said horn with said ring members in generally parallel relation to the axis of said ring members.

References Cited

UNITED STATES PATENTS

| | | | |
|---|---|---|---|
| 2,967,672 | 1/1961 | Zwayer | 242—1.1 |
| 3,253,792 | 5/1966 | Brown et al. | |
| 2,770,424 | 11/1956 | Grove | 242—1.1 |
| 3,102,696 | 9/1963 | Larsh | 242—1.1 |

FOREIGN PATENTS 347,570   7/1960   Switzerland.

OTHER REFERENCES

German application, 1,053,089 April 1956.

BILLY S. TAYLOR, Primary Examiner